Dec. 5, 1950     H. W. SCHUMANN     2,532,823
MOTOR TOOL
Filed Aug. 25, 1949     2 Sheets-Sheet 1
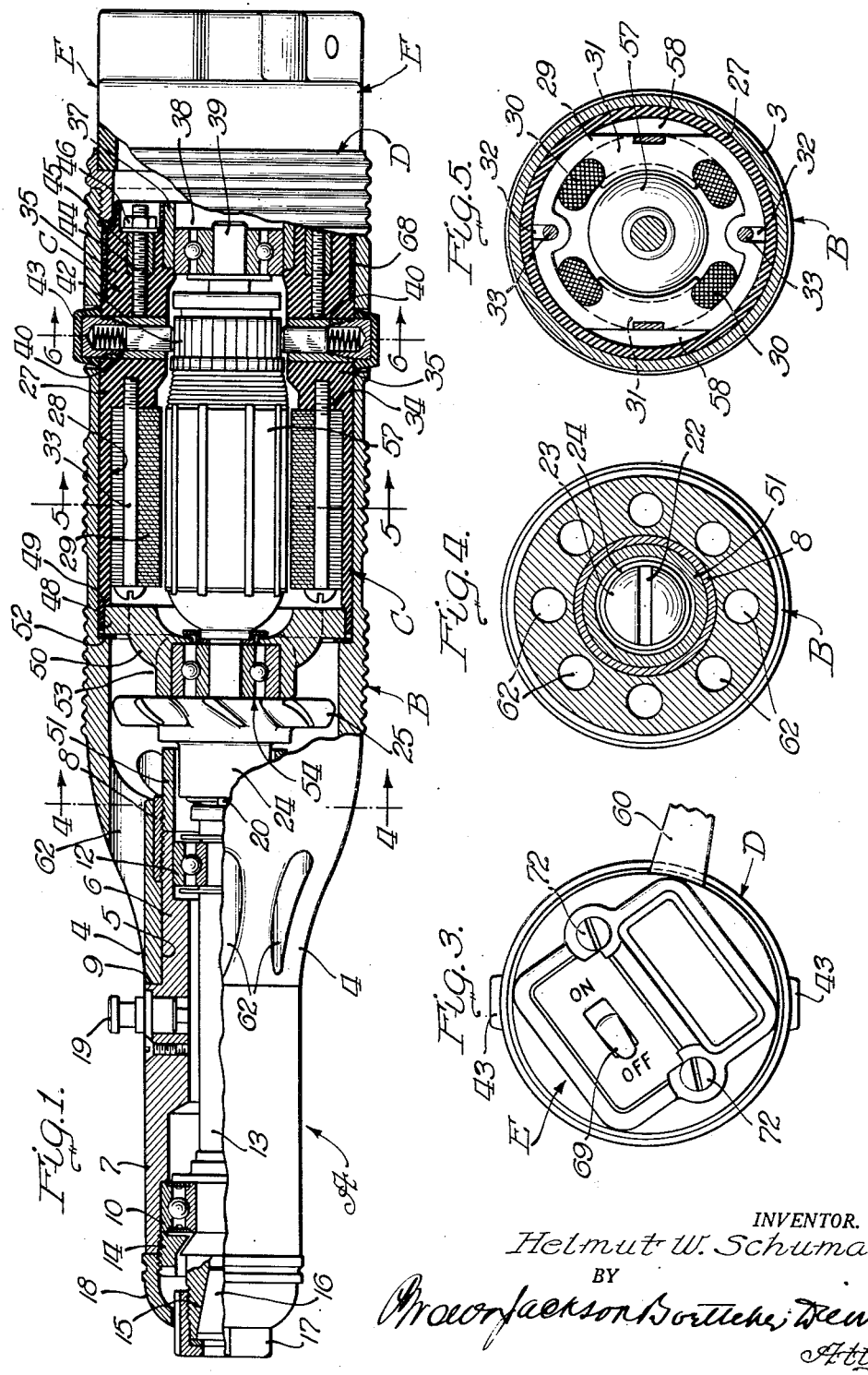
INVENTOR.
Helmut W. Schumann Dec. 5, 1950  H. W. SCHUMANN  2,532,823
MOTOR TOOL
Filed Aug. 25, 1949  2 Sheets-Sheet 2
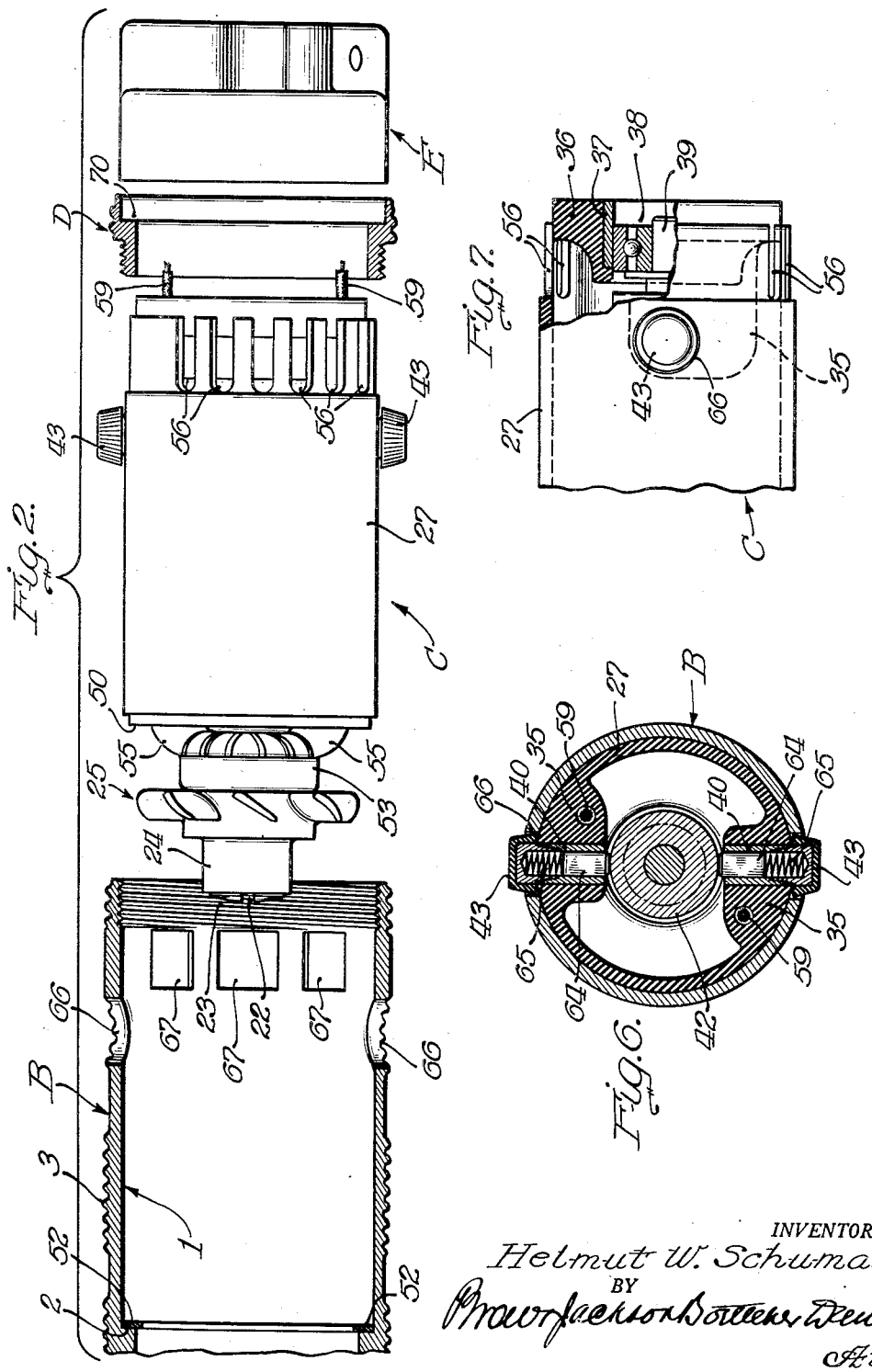
INVENTOR.
Helmut W. Schumann
BY
Brown Jackson Boettcher Dienner
Attys.

Patented Dec. 5, 1950

2,532,823

UNITED STATES PATENT OFFICE 2,532,823

MOTOR TOOL

Helmut W. Schumann, Racine, Wis.

Application August 25, 1949, Serial No. 112,349

12 Claims. (Cl. 172—36)

The present invention is laid in the field of tools utilizing a motor to supply power to a bit which secures its effect by rotation at high speeds. Tools of this character may be held and guided by the hands of the operator, or they may be fixed in a stationary mount to have the work brought to the tip or bit, or they may be mounted in a machine that guides the tip or bit relative to the work, or vice versa. Tools of this character employing tungsten carbide bits or other high duty cutting or abrading bits are now frequently employed in machines which advance the tool relative to the work by a lead screw or other machine feed. For this purpose, the motor may, by way of example, operate at speeds of the order of 45,000 R. P. M., with a power output of the order of one-fifth of a horse power.

To meet the requirements of the art, it is necessary, in a tool of this type, to satisfy a number of strongly conflicting requirements. The tool must have ample strength to stand up under rugged handling and the stresses of clamping in a machine rest with power feeding into the work. The accuracy of alignment of the parts must be continuously maintained. The dimensions and weight must be held to those which are convenient for hand operation. At the same time, ample power to perform the cutting, grinding and other operations must be packed into the tool. Yet the tool must not be allowed to grow hot in the hands of the workman, or to expose anyone to the danger of electric shock.

To construct a tool of this character which will stand up requires extraordinary accuracy and care in construction and assembly. The parts must be accurately balanced, and said accuracy in balance must be maintained under the adverse conditions to which such tools are subjected.

A tool of this type is a production tool. That means that its normal function is the performance of an essential production operation. Stoppage of its operation, as by burning out a coil, requires immediate repair or replacement, otherwise the operator is idle. The natural desire of the operator is to open up the tool and replace the armature or other part or parts. With a tool operating at such high speeds (about 45,000 R. P. M.) dynamic balance is an essential requirement, and to allow the workman to open up and replace indiscriminately the parts which are involved in such high speed operation would be undesirable, because there is a likelihood of unbalance being introduced. If this occurs, the tool will not operate satisfactorily. That is, it will vibrate and tend to do unacceptable work, and it may be so bad as to make the tool useless or even cause it to destroy itself.

I have conceived the possibility of constructing a tool of this character utilizing a renewable unitary motor cartridge which is carefully balanced at the factory. A spare cartridge is delivered to the user of the tool in convenient form for substitution as a unit for a burned-out motor unit. This carefully balanced unitary motor cartridge may then be substituted for a burned out motor without disturbing the accuracy of balance of the motor parts or of the tool as a whole.

It is the object of the present invention to provide a motor tool which will successfully fulfill the above requirements.

In a prior form of motor tool (see Patent No. 2,170,036), the stationary parts in which the movable quill or chuck shaft and the motor armature are journaled, and which in effect constitutes the frame of the device, comprised a shaft support and motor support, both of insulation joined endwise in alignment. The difficulty of establishing and maintaining alignment under the heavy stress of use, and under the requirements for repair or replacement, presented a problem which it was desirable to solve.

According to this phase of the present invention, I construct the tool of a number of sub-assemblies, so organized as to provide a strong and substantially unitary metallic frame and housing of substantially bottle shape, to the neck end of which may be assembled by telescopic engagement a quill assembly consisting of a quill housing, and the contained quill and its bearings with a coupling on one end of the quill, and a chuck on the free end thereof, a unitary motor cartridge assembly, and a switch and terminal housing assembly. The main metallic housing provides a strong frame by means of which the motor assembly and the quill assembly may readily be brought into accurate alignment, and they may be disassembled without disturbing the accurately balanced parts and their bearings.

The resultant structure is exceptionally strong and durable, and yet highly compact. Replacement of an assembly may be effected rapidly and conveniently without throwing out of balance the machine, which, so far as balance goes, is of very delicate character.

While the metallic housing offers the advantage of strength, it introduces certain difficulties, first, that with known constructions, it would be necessary to ground all exposed metallic parts to avoid the danger of electric shock by accidental grounding of a live conductor on the frame, armature, or brushes of the motor. Also, with known constructions the high thermal conductivity of such a metallic housing would unavoidably result in parts of the housing becoming too hot for the hands of the operator.

I have overcome these difficulties by the unique construction of the motor assembly and associated parts by virtue of which the motor assembly is insulated electrically and thermally from the metallic housing, and so large a part of the developed heat carried out by convection that no objectionable temperature rise of any part of the metallic housing occurs.

The motor assembly is in the form of a cartridge which is insertable or removable readily from the main housing without disturbance of the delicately balanced rotating parts. The same is true of the quill assembly. The motor assembly shaft and the quill assembly shaft or quill are connected by an elastic coupling which has ample capacity to take up any minor inaccuracy in alignment of the motor assembly and the quill assembly which might occur in the replacement of either or both of these parts by the user.

The motor assembly cartridge is insulated electrically and thermally from the shell, and the motor shaft is insulated electrically from the quill shaft through the interposed elastic coupling. The unique electrically and thermally insulated motor cartridge for use in connection with a metallic housing and extended drive shaft is an important new factor in this art.

The result is a tool of excellent character, capable of heavy duty over an extended period of trouble-free service. At the same time, a minimum of time and skill is required for replacement of a unit assembly, so that the tool need be out of service only a minimum of time in case of need for repair or replacement.

Now in order to acquaint those skilled in the art with the manner of constructing and operating a device embodying my invention, I shall describe, in connection with the accompanying drawings, a specific embodiment of the same.

In the drawings, in which like reference characters indicate like parts:

Figure 1 is a longitudinal section of a device embodying my invention;

Figure 2 is an exploded view of part of the main housing, the motor cartridge, the locking ring and the terminal and switch housing assembly;

Figure 3 is an end elevational view of the device shown in Figure 1;

Figure 4 is a cross section taken on the line 4, 4 of Figure 1, looking in the direction of the arrows;

Figure 4 is a section on the line 5, 5 of Figure 1;

Figure 6 is a section on the line 6, 6 of Figure 1; and

Figure 7 is a fragmentary, elevational view of the rear end of the motor cartridge, with parts broken away to reveal the disposition of the rear bearing support with respect to the motor armature and its shaft.

In the embodiment selected to illustrate my invention, and as shown in the accompanying drawings, the main parts or assemblies comprise A the quill assembly shown at the left in Figure 1, the main housing B, which is a generally bottle-shaped shell, the motor carriage C, which is adapted to be telescoped inside of the housing B, the locking ring D and the switch housing assembly E.

The main housing element B is preferably a light metal casting, such as an alloy of aluminum having a main cylindrical bore 1 terminating in a shoulder 2 which serves as a stop for the location of the motor cartridge C. The outside surface of the housing may be provided with corrugations consisting of spaced groups of circumferential beads or rings as at 3, disposed at suitable portions of the outside surface for convenience in gripping the tool and for facilitating the dissipation of heat. The said housing B has a neck portion 4 in which there is an axial bore 5 for receiving the cylindrical shank 6 of the quill housing 7. The shank 6 fits closely in the bore 5, and is drawn by means of a threaded ring 8 to engage the shoulder 9 against the end of the neck 4, so as to make a rigid mechanically integral joint between the quill housing 7 and the main housing B. The quill assembly includes the housing portion 7 in which are located suitable anti-friction bearings, in this case, ball bearings 10 and 12, the outer races being set in suitable seats in the housing 7, and the inner races supporting the quill 13. The outer race of the bearings 10 is clamped in place by a clamping ring 14, threaded into the open end of the housing 7. The outer end of the quill 13 has a conical internal seat 15 for receiving a collet 16 which may be contracted by being forced down the tapered seat 15 by means of the chuck nut 17. The open end of the housing 7 is covered by the chuck cap 18 which is readily removable on its threads for easier manipulation of the chuck nut 17. The quill 13 may be held against rotation by a spring retractible pin 19 set in the side walls of the housing 7. The inner end of the quill has an axially extending cross tongue 20 which fits into a slot 22 of a resilient coupling member 23, see Figure 2, seated in a socket in the hub 24 of the axial blower fan 25 mounted on the end of the motor shaft of the motor cartridge C.

The motor cartridge C is a completely assembled, carefully balanced motor in which the magnetic field material, with its windings, the armature, with its shaft and bearings, and the brushes are all supported in a shell 27 of insulation. The said main shell 27 has a main cylindrical bore 28 in which there is seated the magnetic field laminations 29 with their windings 30 (see Figure 5). Slots 32, 32 are formed radially in the outer margins of the laminations (see Figure 5) for receiving the clamping bolts 33 for clamping the magnetic field structure against a radial shoulder 34 formed on two inwardly extending webs 35 which are an integral part of the molded shell. The shell 27 is preferably molded of a stable phenolic resin capable of withstanding relatively high temperatures. These webs 35 extend to the right, as shown in Figure 1, to the rear end of the shell where they join and merge with the head or ring 36 which forms a closure for the right hand end of the shell as viewed in Figures 1 and 7. The said ring or head 36 has a central bore in which there is seated a metal ring 37, preferably molded in place, for receiving the outer or stationary race ring of the rear motor bearing 38. The inner or movable race ring of the bearing 38 is mounted upon the rear end of the motor shaft 39. Tubular, radially disposed brush holders 40 are molded in the webs 35, and these extend from a point adjacent the commutator 42 out to the cylindrical surface of the shell 27. Removable brush caps 43, which are covered with insulation, are adapted to thread into the open ends of the metallic sleeves 40 which constitute the brush holders. These brush holder tubes 40 are connected to electrical terminals consisting of screws 44 threaded through sleeves 45 molded into the ends of the head or ring 36, as shown in Figure 1. Each screw 44 is driven in through its threaded insert sleeve 45 to bear against and make electrical contact with the corresponding brush holder tube 40, and a suitable terminal nut 46 may clamp an electric conductor. The motor is preferably a universal motor with the field and armature windings connected in series, and with the field frame providing a single pair of magnetic poles.

At the opposite end of the shell 27 a counterbore 48 terminates in a shoulder 49, and into this counterbore, and against the shoulder 49, there is set by a press fit the cylindrical rim of the end plate or bearing bracket member 50. This member 50 is made of a metal, preferably a die casting.

The slots 56 which open radially between the inside and the outside of the shell 27 admit air into contact with the active parts of the motor, namely, the armature 57 and the field structure 29, and by operation of the fan 25 which has blades for driving the air axially to the left as shown in Figure 1, air is drawn through the said openings 56, carried along in contact with the armature 57 and its commutator 42, and the field structure 29, and around the field structure by way of the space 58 between the said magnetic laminations 29 and the insulating shell 27 (see Figure 5). The air is withdrawn at the left hand end of the motor assembly, through the openings around the arms 55 and the hub 53, and when the parts are assembled, the air so drawn is driven out through the longitudinal passageways 62 (see Figures 1 and 4) to the outside of the main housing.

The openings 58 pass air flow in contact with the laminations 29 and the end turns 31 at each end of the field windings 30. These openings 58 are aligned with the openings in the bearing bracket 50.

The terminals of the field windings 30 are shown at 59 in Figure 2. They are extended into the switch and fuse housing E (see Figures 2 and 3) and there joined to one of the brush terminals and to one of the incoming electric conductors which are contained in a flexible cable 60 shown in Figure 3. The said flexible cable 60 contains the electric supply conductors and, if desired, may include a grounding conductor for grounding the metallic case of the main housing to prevent accidental shock to the operator under abnormal conditions, but this is not strictly necessary.

In assembling the motor cartridge into the main housing, the cover screws 43 for the electric brushes 64 and their backup springs 65 are removed, and the motor assembly, consisting of the motor cartridge, is then inserted in the open end of the main housing B. The external cylindrical surface of the shell 27 of the motor cartridge fits snugly in the bore 1 in the main housing. An insulating washer 52 is disposed against the shoulder 2 in the main housing, so that when the end of the bearing bracket 50 is pressed against the said washer 52, the structural parts of the motor will be insulated from the main housing. The quill 13 is insulated from the metallic parts of the motor by the rubber coupling 23, which insulates the two parts. The cross web 20 of the quill does not touch the walls of socket 24. This coupling 23 may be made of neoprene. The brushholders 40 are brought into register with the openings 66 in the main housing B and the slots 56 brought into register with the windows 67 formed in the walls adjacent the open end of the main housing B. A ring of screen material, such as metal wire screen 68 (see Figure 1) is disposed over the slots 56 of the motor cartridge, a suitable reduction in diameter of the shell over the slots 56 being made to accommodate the said ring of wire screen.

The locking ring D is then threaded into the open end of the main housing B to press the bearing bracket 50 against the washer 52 and to hold the motor cartridge firmly in place in the bore 1. The engagement of the tongue on the end of the quill 13 with the slot 22 in the neoprene rubber coupling 23 may readily be accomplished by turning the quill until the tongue 20 finds the slot 22. The brushes with their springs and cover screws 43 may then be replaced.

The switch and terminal housing assembly E contains a snap switch, the actuator 69 of which is shown in Figure 3. The said housing assembly has an insulating shell, the left hand end of which, as viewed in Figures 1 and 2, fits in the annular recess 70 of the locking ring D. A pair of axially extending clamping screws 72, 72 extend through the said switch housing E and into tapped holes in the end ring 36 to hold the housing of the switch housing assembly in the said socket 70 in endwise alignment.

The operation of the device will be apparent from the foregoing description. In brief, the switching on of electric current to the motor causes the armature to rotate at high speeds of the order of 45,000 R. P. M., or even higher. Air is drawn by the fan 25 through the screened windows 67 into the inside of the motor, bathing the commutator and the armature and the inside and part of the outside surfaces of the magnetic field structure with a flow of air which passes out through the bearing bracket 50 over the hub 53 through the fan 25, and out through the discharge opening 62.

The operation of the fan 25 at such high speeds tends to produce a plenum of air inside the housing between the fan and the said ventilating discharge opening 62. I have found that the air tends to be driven down into the quill bearings, which action is undesirable. I have discovered that I can exclude the air from the said bearings by extending a sleeve 51 from the housing radially inside the openings 62, extending over the adjacent hub 24 of the fan to a point close enough to the radial surfaces of the fan hub to be effective in connection therewith to throw the air upwardly radially beyond the said tube 51, and thereby compel the plenum of air radially outside of said tube or sleeve 51 to pass out through the said discharge ventilating openings 62. This corrects a fault which has presented considerable difficulty in the past.

Rotation of the armature rotates the quill 13. To change or insert a tip or bit, the pin 19 may be depressed into an opening in the quill 13, and by means of a wrench, the chuck nut 17 may be released and tightened. The pin 19 has an automatic retracting spring for releasing the quill 13.

The motor tool may be gripped and manipulated by hand, or it may be mounted in a stationary mounting which clamps or grips the cylindrical portion of the main casing. It may be used in machine tools, provided with a mechanical feed for advancing the tool against the work, or vice versa. It has a wide variety of uses.

For repair or replacement of any part, it is a simple matter to release the parts substantially in the reverse order of assembly, as above described. That is to say, by loosening the screws 72, the switch housing assembly may be loosened, and the wire terminal connections uncoupled. The locking ring D may then be unscrewed, and by removing the cover screws 43 for the brush holders, and dropping out the brushes and their connected springs, the motor cartridge may be removed as a unit. The quill assembly may readily be removed after the motor cartridge is taken out of the main housing by releasing the locking ring 8 which holds the shank 7 in the bore 5 of the main housing. Thus in case of damage to a part of the motor, which requires repair or replacement, the device may be quickly disassembled and a replacement part re-inserted without requiring highly skilled attention or involving any substantial amount of time. The main parts, i. e., the aforesaid assemblies, which must be carefully assembled and balanced to a great nicety at the factory, need not be disturbed in making such replacements.

Due to the thermal insulation and the arrangement for internal forced draft cooling the metal shell, no part of the shell becomes uncomfortably warm to the hand even under heavy load. This freedom from overheating and the freedom from danger of electric shock along with the other advantages of the tool, as above explained, are much appreciated by users of the tool.

I do not intend to be limited to the details shown and described, except as they are required by the intended limitations of the appended claims.

I claim:

1. A renewable, factory balanced motor cartridge adapted to be inserted into a cylindrical metal housing comprising a cylindrical shell formed of a body of insulation comprising a thick walled ring portion and a thin walled sleeve portion, said ring portion having a bore, a bearing seat set in said bore, the sleeve portion having a bore, a cylindrical field core telescopically lodged in said latter bore, the outer end of the sleeve portion being counterbored to provide a shouldered cylindrical seat, a bearing frame having a cylindrical outer periphery adapted to be lodged in said seat and being fixedly secured therein, said bearing frame having a bearing seat, armature shaft bearings disposed in said seats, an armature disposed in said field core and having a shaft supported in said bearings, said armature having a commutator disposed adjacent said ring, and brush holders containing brushes extending radially through the sides of said shell and registering with said commutator said armature and shaft being dynamically balanced for high speed rotation in said bearings.

2. A motor cartridge housing consisting of a hollow cylindrical shell of insulation of uniform maximum diameter throughout the major part of its length and having an end wall containing a bearing seat, and having radially opening ventilating slots adjacent said end wall, axially extending internal webs joining said end wall and the cylindrical portion of the shell, and having radial openings with tubular brush holders seated in said openings, the open end of the shell having a counterbore for receiving a circular bearing bracket, a bearing bracket fixedly held in said counterbore, said webs having axially extending bores for brush terminal screws and having threaded metallic sleeves set in said bores for receiving said screws, and said screws making electrical contact with said brush holders and being accessible at the end of the shell.

3. In a device of the class described, the combination of a tubular metal housing, a quill assembly having a housing with a shank telescoped in one end of the housing, said quill assembly comprising a sleeve and a quill having bit attaching means at one end and a coupling means at the other journaled in the quill housing, a motor cartridge assembly comprising an insulating shell with metallic bearing inserts at each end bearings in said inserts, an armature having a shaft supported in said bearings, and a magnetic field supported in said shell, said shaft having a coupling means at an end thereof adapted to cooperate with the coupling means of said quill, the cartridge being adapted to fit telescopically into said housing, and a locking ring threaded into the opposite end of the housing for holding the motor cartridge in the housing.

4. In a tool of the class described, a main cylindrical metallic housing having a neck portion at one end, the other end of the housing being open, said neck portion having a central bore, a cylindrical quill housing telescopically seated in said bore, there being axially disposed air discharge passageways through the main housing radially outside and substantially parallel to said neck bore, a quill supported in bearings in said quill housing, said quill having a coupling member comprising a transverse tongue, a motor cartridge comprising an electric motor with an insulating shell fitting telescopically in the open end of the main housing, means for holding said cartridge against endwise withdrawal, said motor including a journaled armature shaft extending from the end of the cartridge and having an axially directed fan mounted on the outer end of the shaft to draw air through the motor and discharge it through said discharge openings, said fan having an axially extending hub with a central socket, an elastic non-conductive coupling lodged in said socket in non-rotative relation to the motor shaft, said coupling having a transverse slot lying substantially inside the socket and adapted to receive by endwise engagement the tongue on the adjacent end of the quill, and an air flow tube secured to the housing radially inside the air discharge openings and extending adjacent to the said hub of the fan for directing the driven air out through said discharge passageways and away from the quill bearings.

5. In a device of the class described, the combination of a main housing having a cylindrical portion, an electric motor in said cylindrical portion, a quill housing, of smaller diameter than that of the cylindrical portion, joined to the main housing by tapered walls, a quill having bearings in said quill housing, said tapered walls having axially extending discharge openings leading from the inside of said cylindrical portion to the outside of the tapered walls, said motor having a shaft coupled to said quill, and a fan mounted on said shaft, said fan having a hub, and an air control sleeve extending from the quill housing over the hub of the fan and lying radially inside said discharge openings to exclude the air driven by the fan from being blown into the bearings.

6. A factory balanced renewable motor cartridge comprising a hollow cylindrical shell of insulating material having a bearing head member at its rear and being open at the front end, said shell having an external cylindrical surface of maximum diameter throughout the major part of its length upon which the cartridge is adapted to be centered and supported, a pair of inwardly projecting webs in the rear end of said shell extending along a part of the length of the shell, said webs containing radially extending metallic brush holders, the radially outer ends of which lie within the confines of the cylindrical surface of the shell, axially extending conductors connected to the brush holders disposed in the webs and extending out of the rear ends of the webs, a stator core structure disposed in the front end of the shell and being clamped axially against the ends of the webs, said head member being joined to said webs and closing the rear end of the shell, said head member having an axial bore with a bearing support disposed therein, a front bearing bracket fixedly secured to the front end of the shell over said opening, a rotor in said shell having a rotor shaft, anti-friction shaft bearings in said bearing support and in said bearing bracket, said shaft having its front end extending forwardly out of said bearing bracket and carrying a fan and one element of an axially separate shaft coupling, the rotating parts of said cartridge being dynamically balanced.

7. The factory balanced renewable motor cartridge of claim 6 further characterized by the rear end of the shell having radial air inlet openings adjacent the said head member, the core having axially extending cooling ducts, the bearing bracket having axially extending air passages and the front end of the shaft carrying a blower fan outside the shell.

8. The factory balanced renewable motor cartridge of claim 6 further characterized by windings for said stator core, said windings having leads extending longitudinally through said webs and being accessible at the rear end of the cartridge.

9. A factory balanced renewable motor cartridge comprising a hollow cylindrical shell of insulation having a bearing head at the rear end, a bearing bracket fixedly mounted on the front end of the shell, a stator core with windings fixedly held in the shell, said bearing head and said bearing bracket having anti-friction shaft bearings, a rotor with windings in said shell and having a shaft mounted in said bearings, said shaft extending forwardly beyond the bearing bracket and carrying a shaft coupling part comprising a hub with an axially extending socket and a non-metallic resilient body seated in said socket, said body having a non-circular opening extending axially therein for endwise coupling with a corresponding non-circular coupling part.

10. The motor cartridge of claim 9 characterized by said shell having an external cylindrical surface by which the cartridge is adapted to be centered and upon which it is adapted to be supported, and having radially extending shoulders at its ends by which it is designed to be held against axial displacement.

11. The factory balanced renewable motor cartridge of claim 9 characterized by electrical terminals for said windings mounted on and accessible at the rear end of said bearing head.

12. In combination, a metallic housing having a cylindrical motor cartridge receiving shell and a quill housing sleeve of smaller diameter forming an extension of said shell, a quill having bearings in said quill housing sleeve, the shell having an internal annular shoulder at the front end which is adjacent the quill housing sleeve, a renewable unit motor cartridge disposed snugly in said shell and resting endwise against said shoulder, said cartridge comprising a cylindrical body of insulation containing a stator with windings and a rotor with windings, the rotor having a shaft carrying a blower fan, bearings for the shaft and bearing supports fixedly carried by said body of insulation, said rotor and its shaft and fan being balanced dynamically for high speed rotation, said unit having connections to said windings accessible from the end of the cylindrical body of insulation of the cartridge, the open end of said metallic shell being threaded, a locking ring for engaging the rear end of the cartridge and being threaded into the shell, and a terminal cap of insulation closing said ring and being secured to the adjacent end of the motor cartridge.

HELMUT W. SCHUMANN.

REFERENCES CITED

The following references are of record in the file of this patent:

UNITED STATES PATENTS

| Number | Name | Date |
| --- | --- | --- |
| 1,922,258 | Packer | Aug. 15, 1933 |
| 1,990,017 | Baumgartz et al. | Feb. 5, 1935 |
| 2,028,176 | Whiteside | Jan. 21, 1936 |
| 2,170,036 | Schumann | Aug. 22, 1939 |
| 2,234,926 | Jepson | Mar. 11, 1941 |
| 2,452,268 | Schumann | Oct. 26, 1948 |

FOREIGN PATENTS

| Number | Country | Date |
| --- | --- | --- |
| 337,834 | Great Britain | Nov. 10, 1930 |
| 404,477 | Great Britain | Jan. 18, 1934 |